United States Patent [19]

Hoffman et al.

[11] 4,082,107
[45] Apr. 4, 1978

[54] AUTOMATIC DRAIN VALVE FOR A COMPRESSED AIR SYSTEM

[75] Inventors: Robert K. Hoffman, Plainwell; David C. Franson, Kalamazoo, both of Mich.

[73] Assignee: Parker-Hannifin Corporation, Cleveland, Ohio

[21] Appl. No.: 793,691

[22] Filed: May 4, 1977

Related U.S. Application Data

[63] Continuation of Ser. No. 637,134, Dec. 3, 1975, abandoned.

[51] Int. Cl.² ............................................. F16T 1/20
[52] U.S. Cl. ................................. 137/195; 137/414; 251/45
[58] Field of Search ............... 137/195, 413, 414, 415, 137/192; 251/45, 61.3

[56] References Cited

U.S. PATENT DOCUMENTS

| | | | |
|---|---|---|---|
| 2,278,002 | 3/1942 | Thompson | 137/414 X |
| 2,726,732 | 12/1955 | Faust | 137/195 |
| 2,972,412 | 2/1961 | Lundeen | 137/192 X |
| 3,418,789 | 12/1918 | Hoffman | 137/195 X |
| 3,447,562 | 6/1969 | Hoffman | 137/414 |
| 3,656,506 | 4/1972 | Jackson | 137/414 |

*Primary Examiner*—Alan Cohan
*Attorney, Agent, or Firm*—John N. Wolfram

[57] ABSTRACT

A drain valve for a compressed air system automatically discharges liquid separated from system air from a container in which the separated liquid is trapped when the trapped liquid activates the drain valve. A spring biases the valve element of the drain valve to an open position to drain the trapped liquid during system shut-down and is positioned in an outlet passage of the container so that the spring is accessible for replacement without disassembly of the drain valve. A float in the container is responsive to the level of trapped liquid to open communication between the system pressure and a chamber on the upper side of a diaphragm type valve actuator to offset the system pressure in a chamber on the lower side of the valve actuator so that the spring and the pressure on the upper side of the valve actuator acting on the valve element moves the valve element to its open position for discharging the trapped liquid. The float includes a cup shaped member whose interior is in the form of an annular chamber with a continuous unbroken surface above its lower end so as to positively trap air therein which prevents excessive amounts of water from entering the float interior whereby water logging of the float is prevented.

The valve element sealingly engages the diaphragm to seal the upper chamber from the lower chamber.

7 Claims, 2 Drawing Figures

AUTOMATIC DRAIN VALVE FOR A COMPRESSED AIR SYSTEM

This is a continuation of application Ser. No. 637,134, filed Dec. 3, 1975 now abandoned.

BACKGROUND OF THE INVENTION

In compressed air systems, such as for supplying air under pressure to air operated motors, it is frequently desirable to filter out foreign matter and to remove water particles from the air before the air is delivered to the motor. To accomplish this it is common practice to direct the air through a filter mounted in a container that also has provision for collecting the water and for automatically discharging the water when it reaches a predetermined level within the container.

Heretofore the automatic drain valves for such units have been quite bulky, costly to produce, and subject to certain other disadvantages. One disadvantage is that the float for actuating the drain valve could get water logged and fail to function. Another disadvantage is that the parts have been difficult to assemble. Another is that certain components have not been readily accessible for replacement or repair.

SUMMARY OF THE INVENTION

The present invention is an improved drain valve for automatically discharging liquid condensed from a pressurized air system. A container in the system collects the liquid and an insert in the container forms an outlet passage for discharging the liquid. An upper and lower chamber formed by a body attached to the insert are separated by a flexible diaphragm that actuates the drain valve element. During system operation the upper chamber is maintained at a level just slightly below system pressure while the lower chamber is open to system pressure and in communication with the trapped liquid in the container.

A float is responsive to liquid level in the container to open the upper chamber to system pressure thereby offsetting the system pressure in the lower chamber so that a spring or other resilient means in the outlet passage and the pressure in the upper chamber acting on a differential area moves the valve element to an open position for draining the lower chamber and container of trapped liquid.

The spring is disposed in the outlet passage so that it is accessible from the outlet passage without disassembly of other portions of the drain valve. If the spring is omitted, the valve element is of such diameter so that the pressure in the upper and lower chambers acting upon the differential areas of the diaphragm in the upper and lower chambers to which it is exposed is sufficient to move the valve element.

In the float a cup member has integral annular sidewalls for forming an air chamber. A bottom cap attaches to the cup member and has a trough or cavity surrounding a portion of the upper chamber so that the float is compactly arranged about the body. A tubular member integral with the upper end of the cup member extends into the trough or cavity on the bottom cap to purge the bottom cap of liquid.

The diaphragm periphery abuts a shoulder on the body and includes a lip seal sealingly engaging the body and a ridge on the insert prevents the diaphragm from disengaging the body while permitting the diaphragm to deflect in response to pressure variations in the upper and lower chambers.

DETAILED DESCRIPTION

Figure 1:
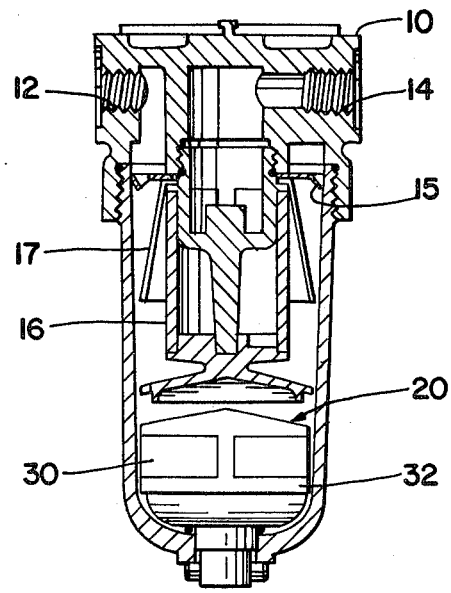
FIG. 1 is a front view, partly in cross section, of the valve of the present invention as connected in a fluid system.

In a fluid line a connector 10 forms a portion of the flow path and is installed between conduit means (not shown) in the system via threaded bores 12 and 14. To separate the liquid from the fluid system a vane 15 spins the fluid and a filter 16 attached to the connector cuts across the flow path through the connector. Liquid separated by the filter and vane drops to the bottom of a container 18 which is threadably engaged to the connector. A skirt 17 aids in directing the liquid towards the bottom. A drain valve 20 of the present invention senses the liquid level in container 18 to selectively discharge the liquid trapped in the container.

Figure 2:
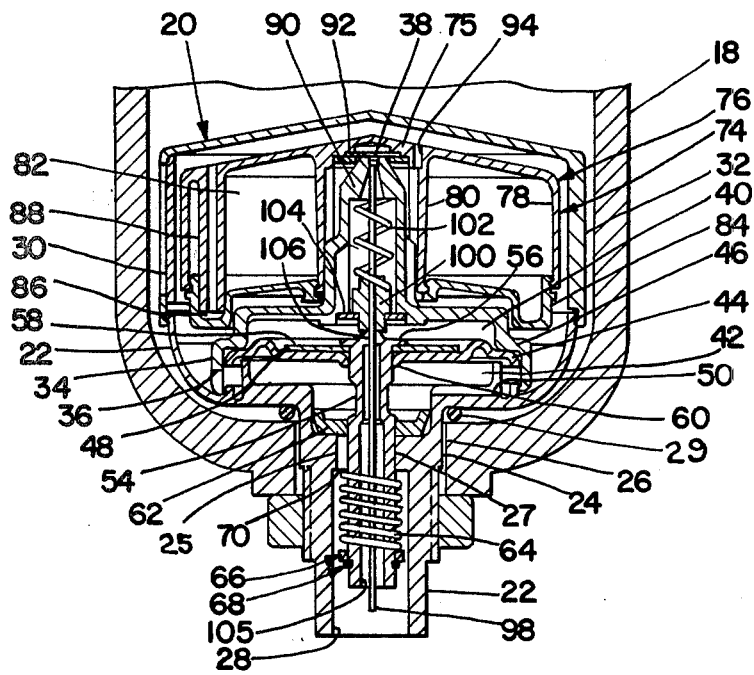
FIG. 2 is an enlarged cross section view of the valve of the present invention.

As more clearly shown in FIG. 2, a cross sectional "Y" shaped insert 22 includes a neck 24 which is mounted in opening 26 in container 18 and has a passage 28 therethrough emptying to atmosphere or a liquid reservoir (not shown) for storing the liquid until proper disposal. An O ring seal 29 seals the insert relative to the container.

As a protection for the interior of the valve 20 a screen 30 is carried by bracket 32 for filtering particles from the liquid which enters the valve via the screen. Latching means on the bracket 32 engage corresponding latching means on the insert 22 for mounting the bracket on the insert.

A body member 34 includes latching means engaging a second set of latching means on the insert 22 for attaching the body member 34 to the insert.

The attached body member 34 and insert 22 form a housing enclosing a chamber and include openings or passages 36 for communicating liquid to the chamber and an opening or passage 38 for communicating system pressure to the chamber.

Separating the housing chamber into an upper chamber 40 and a lower chamber 42, a diaphragm 44 has its periphery sealingly engaging the wall of the housing adjacent a shoulder 46. A segmented ridge 48 on the insert portion of the housing includes slits 50 for communicating system fluid to the lower chamber. This ridge is spaced from but closely adjacent that portion of the diaphragm near the shoulder, thereby enabling the diaphragm to move between shoulder and ridge, yet preventing the diaphragm periphery from disengaging the housing.

A spool valve element 52 includes a reduced diameter portion 54 and a flange 56 abutting a washer 58 which provides for uniform deflection of diaphragm 44 with corresponding movement of valve 52. Sealing lips 60 on the diaphragm 44 sealingly engage the valve element 52 to seal the upper and lower chambers from each other. To close the passage 28 a packing 62 is disposed on a shoulder on the insert and the valve element extends into passage 28 to sealingly engage the packing. A reduced bore portion 27 in common with passage 28 is in close sliding fit with valve element 52 to guide and center the valve element relative to the housing and slots 25 in the reduced opening form flow passages between the lower chamber and passage 28 when the valve element is in open position. A spring or resilient means 64 is disposed in the passage 28 and biases the valve element to a position where reduced diameter 54 is aligned with packing 62 for forming a clearance therebetween so that chamber 42 is open to passage 28. The resilient means is accessible via passage 28 and removable therefrom by disengaging the snap ring 68 and sliding the retaining ring 66 and the resilient means 64 off of the valve element 52. The resilient means abuts a transverse face 70 adjacent the reduced opening on the insert and the retaining ring to bias the valve element towards an open position.

A float 74 senses the liquid level within container 18. The float includes an annular inverted cup member 76 having integrally formed inner and outer sidewalls 80 and 78 for forming an air chamber 82 and a bottom cap 84. Engaging the inner and outer sidewalls the bottom cap encloses the air chamber and forms a radially outer trough or cavity 86 for collecting the liquid that enters the float. Extending into the cavity a tubular member 88 purges the collected liquid when the pressure on the outside of the float is less than the pressure on the inside. In view of the inner and outer sidewalls it is possible for the float to sense liquid and move in response to such liquid regardless the completeness of the connection of the bottom cap to the cup member because no amount of liquid within the float will be able to disperse the air trapped in the chamber 82 without compressing the air. The cup member includes a cover portion 75 centrally within the annular inverted cup member. Carrying a seal means 92, the cover portion opposes the extension 90 of body 34 and the opening 38 so that the seal means abuts the opening to close the same when the float means is in its low position. Bores 94 through the cover portion open the central portion of the float to the exterior.

In order to arrange the float compactly about the housing, the shoulder 46 on the body member portion of the housing is sufficiently stepped so that the cavity 86 within the float in its low position surrounds a portion of the upper chamber in the housing. This enables the float to telescope over the upper chamber within the housing.

Positioned in the upper chamber 40 is a plug 100 biased by spring 102 toward the diaphragm 44, while a retainer 104 limits the low position of the plug.

The plug abuts a bleed passage 106 to close the passage when the valve is in contact with the plug. The bleed passage 106 opens the upper chamber to passage 28 and provides for connecting the upper chamber to atmosphere.

When the system is activated, system pressure is transmitted to the lower chamber via 12, 30, 36 and 50. Spring 64 maintains valve element 52 in its lowered open position permitting system pressure to escape via passage 28 until sufficient pressure builds up on the lower chamber to move the diaphragm and valve element upward so that the bleed opening 106 opposes plug 100. Until the plug opposes the bleed opening, the upper chamber 40 is exposed to atmosphere via bleed passage 106. The valve element now urges plug 100 and stem 98 upward. Stem 98 contacts seal 92 and moves it away from opening 38 whereby system pressure enters the upper chamber. Due to the area difference on which the pressure acts on diaphragm 44 and the spring 64, the diaphragm and valve element move downward as the pressure in the upper chamber approaches that in the lower chamber to position seal 92 against opening 38. At such time the upper chamber is pressurized to substantially the same but about 5 psi less than the pressure in the lower chamber.

As water is separated from the fluid, it collects in the bottom of the container. Trapped liquid enters the lower chamber via 30, 36 and 50. As the liquid level rises, the float also rises to separate seal 92 from opening 38 thereby communicating system pressure to the upper chamber. With pressures in the upper and lower chambers equal a net downward force results because the diaphragm area in the upper chamber on which the pressure acts is greater than that in the lower chamber. This differential area in conjunction with system pressure and the force of spring 64 move the diaphragm and valve element downward. Alhtough this movement opens bleed passage 106, the rate of exhausting to atmosphere is less than the rate entry through opening 38. When the reduced diameter portion of valve element 52 aligns with packing 62, the lower chamber is in communication with passage 28 so that system pressure forces the liquid within the lower chamber out through passage 28.

When the water level has lowered, float 74 positions seal 92 against opening 38 to stop the entry of system pressure into the upper chamber thereby allowing a portion of the pressure in the upper chamber to exhaust through bleed passage 106. The diaphragm begins to rise along with the valve element to close the opening via packing 62. With bleed passage 106 open, the diaphragm continues to rise until plug 100 opposes passages 106 whereupon the upper chamber should be substantially the same but about 5 PSI less than the pressure in the lower chamber.

If the reference pressure in the system is increased the drain valve automatically compensates therefor. Increased system pressure is communicated to lower chamber 42 causing diaphragm 44 to rise until the valve element surrounding the bleed passage 106 pushes plug 100 and stem 98 into contact with seal 92. The rising continues thereby separating the seal from opening 38 so that increased system pressure is communicated via opening 38 to the upper chamber. This causes the diaphragm to move downward until the pressure in the upper chamber is substantially equal to but less than the pressure in the lower chamber. At such time the lowered float will position seal 92 against opening 38 to close the upper chamber thereby rendering the drain valve operable at the increased system pressure.

Conversely, if the reference pressure in the system is reduced the drain valve automatically compensates therefor. The decreased reference pressure is felt in the lower chamber and allows the diaphragm and valve element to move downward because of the upper chamber pressure acting on the differential area and the spring urging the element downward. When the bleed passage separates from the plug the upper chamber exhausts through the bleed passage. Exhausting will continue until the pressure in the upper chamber is substantially equal to but less than the pressure in the lower chamber at which time the diaphragm will move upward to close the bleed passage.

In the present invention it is possible to omit the resilient means 64, snap ring 68 and retaining ring 66. This omission requires the diameter of the valve element 52 to be of such dimension that the forces due to pressure in the upper chamber urging the valve element and diaphragm downward are sufficient to overcome the forces due to pressure in the lower chamber opposing the downward movement of the diaphragm and valve element. During opening of the valve element the pressures in the upper and lower chambers are equal, however the element moves because the pressure in the lower chamber acts on a smaller area of the diaphragm than the pressure in the upper chamber. This differential area is defined by the cross section area of the valve element across the packing 62.

We claim:

1. A valve for automatically draining liquid from a pressurized air system comprising a container having an inlet and an outlet for connection to the system and having a space at its lower end for collecting liquid separated from said air and a space at its upper end for receiving air under pressure from the system, an insert mounted in an opening at the lower end of the container and having a passage therethrough, an inverted cup-shaped member secured to said insert and having screen means in its side wall, a body attached to the insert in radially spaced relation within said member to form a housing with a chamber therein, a diaphragm separating the chamber into upper and lower chambers, a valve element sealingly engaging the diaphragm and extending into the insert passage to close the insert passage and form a differential area across the valve element, resilient means biasing the valve element to a position opening the passage, the housing having a first passage communicating said lower space with the lower chamber through said screen means and having a second passage communicating said upper space with the upper chamber also through said screen means, a float within said member normally closing said second passage, said float being movable by liquid in said lower space toward the upper wall of said member when the liquid reaches a predetermined level to open said second passage so that the air pressure in the upper chamber and the liquid pressure in the lower chamber offset each other whereby said resilient means and the pressure acting against the differential area move the diaphragm and the valve element to an open position and liquid in the lower chamber flows through the insert passage to drain the container.

2. The valve of claim 1 in which said resilient means is disposed between a transverse face on the insert passage and a retaining ring on the valve element.

3. A valve for automatically draining liquid from a pressurized air system comprising a housing forming a chamber within the system and having passages at its upper and lower ends, a diaphragm separating the chamber into an upper and a lower chamber, sensing means responsive to liquid in the system to communicate system pressure via the upper passage with the upper chamber, a valve element movable in the lower passage to open and close the lower passage and engaging the diaphragm, said diaphragm having an outer peripheral portion in sealed engagement with said housing, said housing having a shoulder and a ridge on opposite sides of the peripheral portion of said diaphragm, said shoulder and ridge being axially spaced apart a distance slightly exceeding the axial thickness of the peripheral portion of said diaphragm therebetween thus to axially retain the latter without clamping engagement of the peripheral portion of said diaphragm between said shoulder and said ridge.

4. The valve of claim 3 in which the ridge on the housing is segmented to form passages for communicating the liquid in the system with the lower chamber.

5. The valve of claim 3 in which said housing has an axially extending wall adjacent said shoulder, and said diaphragm has an axially extending lip at its outer periphery engaging said wall.

6. The valve of claim 3 in which an axially extending sealing lip is provided on a central portion of said diaphragm to sealingly engage the valve element so that the upper and lower chambers within the housing are sealingly isolated from each other.

7. The valve of claim 5 in which said lip axially overlaps said ridge and is radially outwardly thereof.